United States Patent
Fan et al.

(10) Patent No.: US 10,822,451 B2
(45) Date of Patent: Nov. 3, 2020

(54) BI-PROFILED FIBER AND PREPARING METHOD THEREOF

(71) Applicant: JIANGSU HENGLI CHEMICAL FIBRE CO., LTD., Wujiang (CN)

(72) Inventors: Hongwei Fan, Wujiang (CN); Fangming Tang, Wujiang (CN); Lixin Yin, Wujiang (CN); Shanshui Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 16/640,065

(22) PCT Filed: Jul. 27, 2018

(86) PCT No.: PCT/CN2018/097504
§ 371 (c)(1),
(2) Date: Feb. 19, 2020

(87) PCT Pub. No.: WO2019/114279
PCT Pub. Date: Jun. 20, 2019

(65) Prior Publication Data
US 2020/0231746 A1 Jul. 23, 2020

(30) Foreign Application Priority Data

Dec. 14, 2017 (CN) .......................... 2017 1 1341958

(51) Int. Cl.

| | |
|---|---|
| *C08G 63/183* | (2006.01) |
| *C08G 63/86* | (2006.01) |
| *D01D 5/253* | (2006.01) |
| *D01D 5/30* | (2006.01) |
| *D01F 1/10* | (2006.01) |
| *D01F 6/92* | (2006.01) |
| *D06M 13/224* | (2006.01) |
| *D06M 13/256* | (2006.01) |
| *D06M 13/292* | (2006.01) |
| *D06M 15/53* | (2006.01) |
| *D06M 101/32* | (2006.01) |

(52) U.S. Cl.
CPC ......... *C08G 63/183* (2013.01); *C08G 63/866* (2013.01); *D01D 5/253* (2013.01); *D01D 5/30* (2013.01); *D01F 1/10* (2013.01); *D01F 6/92* (2013.01); *D06M 13/224* (2013.01); *D06M 13/256* (2013.01); *D06M 13/292* (2013.01); *D06M 15/53* (2013.01); *D06M 2101/32* (2013.01)

(58) Field of Classification Search
CPC .... C08G 63/183; C08G 63/78; C08G 63/866; D01D 4/02; D01D 5/08; D01D 5/092; D01D 5/24; D01D 5/253; D01D 5/30; D01F 6/84; D01F 6/62; D01F 6/92; D01F 1/10; D06M 13/256; D06M 13/292; D06M 13/224; D06M 5/53; D06M 2101/32; D04H 1/4391; D04H 3/018; Y10S 57/905
USPC ....... 428/379, 480, 475.2, 458; 57/248, 905; 425/131.5, 382.2; 264/177.13, 176.1, 264/210.8, 45.9; 523/200; 524/605; 156/244.22
See application file for complete search history.

(56) References Cited

U.S. PATENT DOCUMENTS

2004/0054372 A1  3/2004  Corden et al.

FOREIGN PATENT DOCUMENTS

| CN | 101168855 A | 4/2008 |
|----|----|----|
| CN | 106283253 A | 1/2017 |
| CN | 106283261 A | 1/2017 |
| CN | 106400166 A | 2/2017 |
| CN | 108130605 A | 6/2018 |
| CN | 108130613 A | 6/2018 |
| CN | 108130624 A | 6/2018 |
| JP | 2008163485 A | 7/2008 |

*Primary Examiner* — Camie S Thompson
(74) *Attorney, Agent, or Firm* — Bayramoglu Law Offices LLC

(57) ABSTRACT

A bi-profiled fiber and preparing method thereof are provided. The bi-profiled fiber is manufactured through the steps of spinning melt metering, extruding via the composite spinneret, cooling, oiling, drawing, heat setting and winding, finally containing both double-cross monofilaments and circular monofilaments simultaneously. The bi-profiled fiber is made of the modified polyester, and the modified polyester is dispersed by matte agent and is composed of terephthalic acid segments, ethylene glycol segments and branched diol segments, and the branched diol segment has a structural formula of

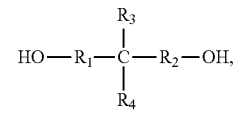

where $R_1$ and $R_2$ are separately selected from the linear alkylene with 1-3 carbon atoms, $R_3$ from the alkyl with 1-5 carbon atoms, and $R_4$ from the alkyl with 2-5 carbon atoms. The matte agents is a mixture of amorphous titanium dioxide and amorphous silicon dioxide, or a mixture of calcium carbonate and amorphous silicon dioxide.

19 Claims, No Drawings

BI-PROFILED FIBER AND PREPARING METHOD THEREOF

CROSS REFERENCE TO THE RELATED APPLICATIONS

This application is the national phase entry of International Application No. PCT/CN2018/097504, filed on Jul. 27, 2018, which is based upon and claims priority to Chinese Patent Application No. 201711341958.7, filed on Dec. 14, 2017, the entire contents of which are incorporated herein by reference.

TECHNICAL FIELD

The present invention belongs to the field of fiber manufacture, and more particularly, relates to one type of bi-profiled fiber and preparing method thereof.

BACKGROUND

With the development of modern textile technology and the continuous improvement of people's living standards, much higher requirements have been put forward on the output, performance and quality of chemical fibers used in clothing, decoration and industrial textiles. Therefore, in recent years, researchers have devoted themselves to the research and development of new varieties of chemical fibers to meet the market demand for high value-added fibers.

Softness of textile materials is mostly characterized by comfortable touch, smooth surface and low bending resistance, whereas stiffness is mostly characterized by good touch elasticity and strong sense of backwash. Moreover, stiffness, as one of the basic styles of fibers, would promise fibers good recovery and high flexural properties, which are related to people's physiological and psychological sensory on textiles. Generally, softness and stiffness are a pair of contradictions, and it is difficult to combine them perfectly.

The properties of yarns and fabrics may be affected by the cross-sectional shape of fibers, which could be molded via different cross-sectional shapes and sizes of spinnerets during the fiber spinning. Specifically, the material and shape of fibers affect the properties of fibers, the arrangement of fibers in yarns affects the properties of yarns, and the arrangement of yarns in fabrics affects the properties of fabrics. Therefore, the shape of fibers is one of the essentials of yarn or fabric performance. Profiled fibers are those chemical fibers spun through spinneret orifices with certain geometric shapes to obtain special cross-section shape and function. Up to present, many kinds of profiled fibers have been explored and roughly categorized as triangle, polygon, flat, hollow, diamond and so on according to their cross-section shape. However, single shape means single function, and it is almost impossible for a fabric to obtain both softness and stiffness simultaneously just from one kind of fiber cross-section. The combination of softness and stiffness should be realized from the diversification of cross-section shape.

In recent years, bi-profiled fiber or multi-profiled fiber process, i.e., co-spinning at least two types of filaments with different cross-sectional shape by means of one and the same spinneret, have been employed to combine the advantages of each filament and endue the fabric with high quality and functional diversity. Although there are literatures and patents on this field, the actual fiber production is difficult to proceed smoothly. For instance, a certain amount of pressure drop will occur during the fiber spinning when the viscoelastic polymer melt such as the non-Newtonian polyester fluid pass through the spinneret orifice, as a matter of fact, the shape, size and length of the spinneret orifice have a great impact on the pressure drop. However in the existing research about spinneret orifice during the profiled fiber manufacture, only the shape identity or cross-sectional area equality but not the interaction between shape, size and length have been considered, causing the pressure drop disaccord and the extrusion speed difference between the polyester filaments flowing out from the different shape of orifices in the same spinneret.

Therefore, overcoming the defects in the existing technology for spinning bi-profiled fibers or multi-profiled fibers from the same spinneret and preparing the yarns composed of filaments with multiple cross-section shapes so as to achieve ideal softness and stiffness at the same time has become an urgent problem to be solved

SUMMARY

A primary object of the present invention is to provide one kind of bi-profiled fiber and preparing method thereof, wherein the bi-profiled fiber possesses both softness and stiffness simultaneously.

Another object of the present invention is to provide a method for preparing bi-profiled fiber, wherein the bi-profiled fiber is made of modified polyester in which the branched diol has been incorporated to reduce the cyclic oligomer produced in the side reaction of polymerization.

Another object of the present invention is to provide a method for preparing bi-profiled fiber, wherein the quality of bi-profiled fiber has ever been improved by adopting the crown ether oil with high heat resistance and lubricity.

Another object of the present invention is to provide a method for preparing bi-profiled fiber, wherein the spinning stability ofbi-profiled fiber has ever been promoted by adopting a compositional spinneret in which two kinds of orifices with different special shapes were installed, and the length, cross-sectional area and cross-sectional circumference of those two orifices were appropriately related.

Another object of the present invention is to provide a method for preparing bi-profiled fiber, wherein the softness and stiffness of bi-profiled fiber originate respectively from two monofilament components extruded from the same spinneret, i.e., double-cross monofilament stands for stiffness while circular monofilament stands for softness.

Another object of the present invention is to provide a method for preparing bi-profiled fiber, wherein the surface of bi-profiled fiber presents a matte state owing to the crystallization and orientation of polyester has been hindered by within dispersed inorganic matte particles such as the amorphous titanium dioxide and amorphous silicon dioxide mixture, or the calcium carbonate and amorphous silicon dioxide mixture.

Accordingly, to achieve above mentioned objects, the present invention provides a technological scheme for one type of bi-profiled fiber which (a) is composed of double-cross monofilaments and circular monofilaments simultaneously extruded from the same spinneret, (b) is made of modified polyester dispersed within by matte agents.

Actually, the flexural stiffness of a material is mainly determined by its physical properties, cross section size and cross-section shape, etc. For fiber materials, flexural stiffness usually refers to the degree of rigidity or softness of fibers, and is an important index reflecting the ability to resist bending deformation. Flexural stiffness of fiber aggregates depends not only on the flexural property of monofilaments, but also on the interaction between monofilaments to a greater extent. Compared with monofilament with circular cross section, monofilament with double-cross section has larger flexural modulus because of its larger cross-section area and its unique cross-section shape, showing better stiffness and dimensional stability, meanwhile the ultrafine denier filaments with circular cross-section can play a soft and silky role. Therefore, the bi-profiled fiber from the composition of double-cross monofilaments and circular monofilaments can promise both stiffness and softness.

Moreover, the molecular chain of modified polyester includes terephthalic acid segments, ethylene glycol segments and branched diol segments, and herein said branched diol has a structural formula of

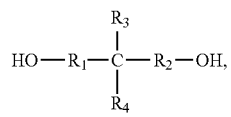

in which $R_1$ and $R_2$ are separately selected from the linear alkylene with 1-3 carbon atoms, $R_3$ from the alkyl with 1-5 carbon atoms, and $R_4$ from the alky with 2-5 carbon atoms. The purpose of introducing branch or long carbon chain into diol is to reduce the electronegativity of the alkoxy group. The small number of carbon atoms would just affect little on the electronegativity of the alkoxy group and have no significance in reducing the generation of cyclic oligomers, whereas the large number of carbon atoms would cause intermolecular entanglement and influence the distribution of molecular weight. The principle of reducing cyclic oligomers in the present invention is illustrated as follows.

In organic compounds, the angle between two chemical bonds formed between intramolecular atoms, called bond angle and usually expressed in degrees, is affected by the electronegativity of central atoms and coordination atoms. When the electronegativity of the coordination atoms bonded with the central atom increases, i.e., the electron absorption ability of the coordination atoms increases, the electron pairs will move toward the coordination atom whereas far away from the central atom.

Therefore, the chemical bonds will move closely with each other due to the reduction of repulsion force and the bond angle will decrease. On the contrary, when the electronegativity of coordination atoms decreases, namely, their donor ability increases, the electron pairs will move close to the central atom, hence the increase of repulsion force will drive the chemical bonds away from each other and the bond angle will also increase.

According to Pauling's electronegativity scale, the electronegativity of C, H and O atom is 2.55, 2.20 and 3.44, respectively. Furthermore, on the basis of valence electron energy balance theory, the electronegativity of an atom group can be calculated through the formula of $$\chi_{ve}(G) = \frac{\Sigma n_i \chi_i N_{ve,i}}{\Sigma n_i N_{ve,i}},$$

in which $\chi_i$ is the electronegativity of neutral atom i before bonding, $N_{ve,i}$ is the number of valence electrons in atom i, and $n_i$ is the number of atom i in molecule. The main steps for calculating the electronegativity of a complex atom group are as follows: a) calculating the electronegativity of simple group, b) treating the simple group as a quasi-atom and recalculating the electronegativity of the assembly of quasi-atoms, c) iterating the above calculations. It should be noted that in calculating the electronegativity of quasi-atoms, the unbounded valence electrons in the base atoms (e.g., the base atom of group —OH is O atom) should be regarded as the valence electrons of quasi-atoms.

During the esterification of terephthalic acid with diol, atom C released from the broken C—O bond of carboxyl group in terephthalic acid will combine with the atom O of hydroxyl group in the diol to form a new C—O bond in the ester group. If the angle between the bond C—C(one C belongs to the ester group and the other C to the benzene ring) and the newly formed bond C—O is marked as a, the change of the bond angle α will affect the cyclization reaction. Specifically, the cyclization will be easy if a is less than 109°, whereas the cyclizing probability will decrease when a becomes lager. In the present invention, the diol whose alkoxyl part possess a weakened electronegativity because of the introduction of branch and long alkyl chain, just as shown in the above formula, has been adopted in the esterification. It could been found from the calculation that when linking with carbonyl group, the electronegativity of alkoxyl part in the branched diol is 2.59-2.79 whereas the value is 3.04 for the —$OCH_2CH_2$— part in ethylene glycol, which means the electron donation ability of alkoxyl group in branched diol will be stronger than that in ethylene glycol. Therefore, a bond angle α lager than 109° will be formed when branched diols are introduced into the esterification reaction, which can reduce the generation of cyclic oligomers In the present invention, the matting agent is chosen as a mixture of amorphous titanium dioxide and amorphous silicon dioxide, or a mixture of calcium carbonate and amorphous silicon dioxide.

Pure PET fiber, as a translucent material, usually shows high surface glossiness. The glossiness of PET fiber depends not only on the reflection but also on the transmission, at the same time, is also affected by the surface state, the cross-sectional shape and the internal structure of the fiber. For instance, the fibers with high molecular orientation can cause strong light reflection and show bright gloss because of their internal uniform structure. Therefore, the glossiness of the fibers can be regulated by adding inorganic particles as delusterant or by adjusting the cross-sectional shape and surface structure of the fibers. In general, matting agents can be added in the process of PET polymerization to make the delustered fibers with glossiness close to that of cotton fibers, and the commonly used polyester matting agent is anatase titanium dioxide. In the present invention, the mixture of amorphous titanium dioxide and amorphous silica or the mixture of calcium carbonate and amorphous silica instead of anatase crystals have been chosen as the inorganic matte particles, which were evenly dispersed in PET to reduce the crystallization and orientation of PET fibers so as to make a matte surface state.

As a preferred technology program, for the bi-profiled fiber mentioned above, wherein the double-cross monofilaments have a fineness of 2.5-3.5 dtex and wherein said circular monofilaments have a fineness of 0.20-0.30 dtex;

herein said double-cross monofilaments possess a relatively high flexural stiffness of $0.82 \times 10^{-5}$-$1.38 \times 10^{-5}$ cN·cm² so as to promise the fiber high stiffness, while herein said circular monofilaments possess a relatively low flexural stiffness of $0.0041 \times 10^{-5}$-$0.027 \times 10^{-5}$ cN·cm² to promise good softness;

herein said double-cross monofilaments possess a relatively high flexural stiffness of $0.82 \times 10^{0.5} - 1.38 \times 10^{-5}$ cN·cm$^2$, whereas herein said circular monofilaments possess a relatively low one of $0.0041 \times 10^{-5} - 0.027 \times 10^{-5}$ cN·cm$^2$. The higher flexural stiffness the better crispness, and the lower flexural stiffness the better softness, therefore, the bi-profiled fiber composed of both double-cross monofilaments and circular monofilaments could promise stiffness and softness simultaneously.

herein said bi-profiled fiber has a fineness of 150-300 dtex, a breaking strength of greater than or equal to 3.6 cn/dtex, a breaking elongation of 40.0±3.0%, a breaking strength CV of less than or equal to 5.0%, a breaking elongation CV of less than or equal to 10.0%, a boiling water shrinkage of 7.5±0.5%, and a glossiness of less than 50% which is obviously lower than that of the fibers made by the existing technology.

For the bi-profiled fiber mentioned above, wherein the modified polyester has a cyclic oligomer content less than or equal to 0.6 wt %, showing a remarkable subduction relative to 1.5-2.1 wt % of cyclic oligomer in the polyester prepared by the prior technology;

herein said modified polyester has a relatively high number average molecular weight of 20000-27000 and a wide molecular weight distribution index of 1.8-2.2, which is suitable for the spinning processing and is conducive to the preparation of fibers with excellent properties;

herein said modified polyester has a relatively low branched diol segment content just as 3-5 mol % of the terephthalic acid segments, which is beneficial to maintaining the excellent performance of the polyester itself;

herein said branched diol can be one of following compounds: 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis(1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl-1,6-hexanediol or 3,3-dipropyl-1,5-pentanediol.

For the bi-profiled fiber mentioned above, wherein the modified polyester is prepared through the esterification and the subsequent polycondensation of homogeneously mixed terephthalic acid, ethylene glycol and branched diol, and the specific steps are as follows:

(1) Esterification;

Firstly, terephthalic acid, ethylene glycol and the branched diol are mixed into a slurry, then the esterification is carried out under the pressure of nitrogen after adding catalyst, extinction agent and stabilizer, wherein the pressure range from atmospheric pressure to 0.3 MPa while reaction temperature is 250-260° C., and the end point of esterification is chosen as the moment when the elimination of water reach 90% of the theoretical value;

(2) Polycondensation;

After the esterification hereinabove, the polycondensation is performed at negative pressure to obtain modified polyester eventually, which includes two successive stages, i.e., a) coarse vacuum stage, wherein the pressure is smoothly reduced from the normal value to less than 500 Pa within 30-50 min, and the reaction temperature is 275-285° C. while reaction time is 30-50 min, b) fine vacuum stage, wherein the pressure is furtherly reduced to less than 100 Pa, and the reaction temperature is 260-270° C. while reaction time is 50-90 min.

In step (1), a molar ration of the terephthalic acid, the ethylene glycol to the branched diol is 1:(1.2-2.0):(0.03-0.06), an amount of the catalyst is 0.01-0.05% by weight of the terephthalic acid, an amount of the extinction agent is 0.20-0.25% by weight of the terephthalic acid and an amount of the stabilizer is 0.01-0.05% by weight of the terephthalic acid;

wherein the catalyst is one of antimony trioxide, antimony glycol or antimony acetate, wherein said extinction agent is titanium dioxide, and the stabilizer is one of triphenyl phosphate, trimethyl phosphate or trimethyl phosphite.

For the bi-profiled fiber mentioned above, wherein said matting agent addition is 1.0-1.5 wt % of the modified polyester, and the content of amorphous silica in the matting agent is 13-50 wt %.

Additionally, in the present invention a method for preparing the bi-profiled fiber mentioned above is also provided, generally including the steps of spinning melt metering, extruding via the composite spinneret, cooling, oiling, drawing, heat setting and winding;

herein said spinning melt comprises the modified polyester and the matting agent;

herein said composition spinneret is simultaneously provided with double-cross shaped orifices and circular orifices, and the length ratio of double-cross orifice to circular orifice is equal to the product of their equivalent diameter ratio and a coefficient K, here equivalent diameter is the ratio of orifice cross-section area to its circumference and K ranges from 0.97 to 1.03;

herein said oiling involves the oiling agent containing 67.30-85.58 wt % of crown ether, whose content should be kept within a certain range to avoid the loss of low viscosity, good heat resistance and high oil film strength in case the content is too low, or the loss of the rest performance indices in case the content is too high.

In the present invention, an oiling agent with low viscosity, good heat resistance and high oil film strength is obtained by adding crown ether, a heterocyclic organic compound with multiple ether groups. The wettability of crown ether surfactants is greater than that of corresponding open-chain compounds, especially, crown ethers have better solubilization. In general, salt compounds have lower solubility in organic compounds, however which could be improved if adding crown ethers. In the existing technology, the high viscosity of oils is mainly due to the inclusion of common polyester compounds or polyether compounds. Because of the larger molecular weight and hydrogen bond, the intermolecular interaction of these compounds is characterized by higher kinetic viscosity, which results in higher viscosity of oils. The viscosity of oils can be significantly reduced by adding crown ether, mainly due to the low self-viscosity and small beaded molecular shape of crown ether, therefore, the crown ether can be well compatible with polyester or polyether oils, and enter into the molecular chains of polyester or polyether compounds at the same time, shielding the interaction force between molecular chains, thus reducing the viscosity of the oils. In the existing technology, the oil film strength of oiling agent is low mainly because the antistatic component mostly contains metal ions or exists in the form of salt, which results in poor compatibility between antistatic agent and polyester or polyether compound, whereas the mechanism of crown ether improving oil film strength is that crown ether can produce salt-soluble effect when entering oiling agent, which improves the compatibility between the antistatic agent and the polyester or polyester compound, and then enhances the oil film strength. In addition, crown ether has higher volatilization point and excellent thermal stability so as to significantly improve the thermal resistance of oiling agent.

As a preferred technology program, for the preparing method mentioned above, wherein the double-cross spinneret orifices or circular spinneret orifices have a length of 0.24-2.08 mm and an equivalent diameter of 0.12-0.52 mm;

All the spinneret orifices, specifically, all the center of circular orifices or all the circumferential center of double-cross orifices are arranged in regular intervals along the equally spaced concentric circles on the spinneret, and in the same ring both double-cross orifices and circular orifices are set up with a number ratio of 1:10-30.

For the preparing method mentioned above, wherein said oiling agent possesses a significantly improved thermal resistance by introducing crown ether with higher volatilization point and excellent thermal stability, and would just loss less than 15 wt % of its weight even being heated at 200° C. for 2 hours;

herein said oiling agent has a kinetic viscosity of 27.5-30.1 mm$^2$/s at 50±0.01° C., which would become 0.93-0.95 mm$^2$/s when the oiling agent is dispersed with a content of 10 wt % in water to form a emulsion; the viscosity of oils can be significantly reduced by adding crown ether, mainly due to the low self-viscosity and small beaded molecular shape of crown ether, therefore, the crown ether can be well compatible with polyester or polyether oils, and enter into the molecular chains of polyester or polyether compounds at the same time, shielding the interaction force between molecular chains, thus reducing the viscosity of the oils;

herein said oiling agent has an oil film strength of 121-127N, which is higher than about 110N of the common oiling agents, and the oil film strength of common oiling agent is low mainly because the antistatic component mostly contains metal ions or exists in the form of salt, which results in poor compatibility between antistatic agent and polyester or polyether compound, whereas the mechanism of crown ether improving oil film strength is that crown ether can produce salt-soluble effect when entering oiling agent, which improves the compatibility between the antistatic agent and the polyester or polyester compound, and then enhances the oil film strength;

herein said oiling agent shows a surface tension of 23.2-26.8 cN/cm and a specific resistance of $1.0 \times 10^8$-$1.8 \times 10^8$ Ω·cm, and after oiling the static friction coefficient and dynamic friction coefficient between fibers are 0.250-0.263 and 0.262-0.273 respectively, the static friction coefficient and dynamic friction coefficient between fibers and metals are 0.202-0.210 and 0.320-0.332 respectively;

herein said crown ether is one of 2-hydroxymethyl-12-crown ether-4, 15-crown ether-5 or 2-hydroxymethyl-15-crown ether-5;

herein said oiling agent also contains mineral oil, potassium phosphate, trimethylolpropane laurate and sodium alkyl sulfonate, and the mineral oil is one of 9#-17# mineral oil;

the phosphate potassium salt is one potassium salt of dodecyl phosphate, iso-tridecanol polyoxyethylene ether phosphate or dodeca-tetradecanol phosphate;

the sodium alkyl sulfonate is one sodium salt of dodecyl sulfonate, pentadecyl sulfonate or hexadecyl sulfonate;

herein said oiling agent should be dispersed with a content of 10-20 wt % in water to form an emulsion before used;

herein said oiling agent can be prepared via evenly mixing crown ether, potassium phosphate, trimethylolpropane laurate and sodium alkyl sulfonate and then adding the mixture into mineral oil, specially, counted by weight parts the oiling agent consists of

| | |
|---|---|
| mineral oil | 0-10 phr, |
| trimethylolpropane laurate | 0-20 phr, |
| crown ether | 70-100 phr, |
| potassium phosphate | 8-15 phr, |
| sodium alkyl sulfonate | 2-7 phr; | moreover, the so-called mixing means a stirring process carried out at 40-55° C. for 1-3 hours.

For the preparing method mentioned above, the spinning technologies for the bi-profiled fiber could be chosen as

| | |
|---|---|
| Spinning temperature | 280-290° C., |
| Cooling temperature | 20-25° C., |
| Interlacing pressure | 0.20-0.30 MPa, |
| Speed of godet roller 1 | 2200-2600 m/min, |
| Temperature of godet roller1 | 75-85° C., |
| Speed of godet roller 2 | 3600-3900 m/min, |
| Temperature of godet roller 2 | 135-165° C., |
| Winding speed | 3580-3840 m/min, | herein said winding speed is set as 1% lower than that of godet roller 2 to realizing overfeeding, hence reducing the winding tension, maintaining the spinning stability and improving the quality of the final fibers, furthermore, the initial pressure of spinning pack is 120 bar and the pressure rising ΔP is equal to or less than 0.6 bar/day.

The mechanism of this invention could be described as follows:

During the fiber spinning process, the polyester melt, as a non-Newtonian viscoelastic fluid, would deform to release the elastic energy stored during the viscous flowing through the spinneret orifices, which in fact is one of the key factors to affect the spinning stability. It is easy to understand that the length, the cross section circumference and the cross section area of those spinneret orifices have a great influence on the storage and relaxation of the elastic energy in the melt. By designing the length, the cross section area and the cross section circumference for two type of orifices in the same spinneret, as well as establishing a certain relationship between the dimensions of the two type of spinneret orifices, in the present invention the similar pressure drop for two type of orifices and the effective relaxation of elastic energy in the melt are realized, reducing the unstable die swell, thus ensuring the smooth and stable fiber spinning.

The pressure drop for a melt passing through the spinneret orifice can be calculated via the formula $$\Delta P = \frac{S_{inner}}{S_{section}} \cdot \tau$$

here ΔP is the pressure drop of spinning melt, Sinner is the inner wall area of spinneret orifice which is equal to the product of the length and the cross section circumference of spinneret orifice, $S_{section}$ is the cross section area of spinneret orifice, while i is the shear stress of the flowing melt.

In order to maintain the same or similar extrusion speed for the polyester melts flowing through different shape of orifice A and B in the same spinneret, the melt pressure drops for both orifices should be kept the same or within a certain difference range, i.e., $\Delta P_A = K \Delta P_B$, here the coefficient K is 0.97-1.03. Therefore, the relationship of the orifice length relative to the cross section circumference and cross section area of the orifice for both A and B can be deduced just as $$\frac{D_A}{D_B} = K\frac{S_A}{S_B} \times \frac{L_B}{L_A} = K\frac{B_A}{B_B}$$

here D is the length, S the cross section area, L the cross section circumference, and B the equivalent diameter for a certain type of spinneret orifice.

Through such designed spinneret just as mentioned above, the double-cross shaped monofilament and the circular shaped monofilament can be extruded simultaneously from the same spinneret, and the final fibers possess both good stiffness and good softness.

In conclusion, the present invention provides (6) one type of applicable bi-profiled fiber containing both good stiffness and good softness;

(7) the preparing method for the bi-profiled fiber, wherein the oiling process can improve the spinning stability and fiber processability because the crown ether-contained oiling agent has the characteristics of low viscosity, good heat resistance, high oil film strength, good smoothness and strong antistatic property;

(8) the preparing method for the bi-profiled fiber, wherein the smooth and stable fiber spinning can be ensured by adopting a compositional spinneret in which two kinds of orifices with different special shapes are installed, and the length, cross-sectional area and cross-sectional circumference of those two orifices are appropriately related, so as to realize the similar pressure drop for the polymer melts flowing through two type of orifices;

(9) the preparing method for the bi-profiled fiber, wherein the surface of bi-profiled fiber presents a matte state owing to the crystallization and orientation of polyester has been hindered by within dispersed inorganic matte particles such as the amorphous titanium dioxide and amorphous silicon dioxide mixture, or the calcium carbonate and amorphous silicon dioxide mixture;

(10) the preparing method for the bi-profiled fiber, wherein the bi-profiled fiber is made of modified polyester in which the branched diol has been incorporated to change the bond angles of polyester and then reduce the cyclic oligomer produced in the side reaction of polymerization.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

In general, the procedure of the preparing method for bi-profiled fiber includes:

(1) Preparation of spinning melt (1.1) Preparation of modified polyester (a) Esterification Firstly, a slurry of terephthalic acid, ethylene glycol and the branched diol with a molar ratio A' is concocted and properly mixed with the catalyst, the extinction agent and the stabilizer, then the esterification is carried out in the nitrogen atmosphere under the pressure of B' and the temperature of C. The end point of esterification is chosen as the moment when the elimination of water reach D' of the theoretical value. The additive contents (mass percentages relative to terephthalic acid) of the catalyst, the extinction agent and the stabilizer are E, F and G, respectively.

(b) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the normal value to I within a time of H, and the reaction temperature is J while reaction time is k, b) fine vacuum stage, wherein the pressure is furtherly reduced to L', and the reaction temperature is M while reaction time is N. The obtained modified polyester possesses a molecular chain structure composed of terephthalic acid segments, ethylene glycol segments and the branched diol segments (whose molar content is R respect to that of terephthalic acid segments), a cyclic oligomer content of O, a number average molecular weight of P and a molecular weight distribution index of Q.

(1.2) The modified polyester is dispersed by the extinction agent, i.e., the mixture of amorphous titanium dioxide and amorphous silica. The additive content of the extinction agent in polyester is S', and in the extinction mixture the content of amorphous silica is T.

(2) Concoction of oiling agent

Crown ether, potassium phosphate, trimethylolpropane laurate and sodium alkyl sulfonate are fully blended under room temperature and then added into the mineral oil, and stirred furtherly under a temperature of t1 for a time of t2 to produce the oiling agent. Counted by weight parts, the oiling agent consists of a1 phr of mineral oil, a2 phr of trimethylolpropane laurate, a3 phr of crown ether, a4 phr of potassium phosphate and a5 phr of sodium alkyl sulfonate. The obtained oiling agent has a crown ether content of b, a high temperature resistance (b2 wt % of weight loss, after 2 hr of heating at 200° C.), a low viscosity (b3 of kinetic viscosity at 50±0.01° C., or b4 when dispersed with a content of 10 wt % in water to form an emulsion), a high oil strength of c1, a surface tension of c2 and a specific resistance of c3. After oiling the static friction coefficient and dynamic friction coefficient between fibers are $\mu_s$ and $\mu_d$, while the static friction coefficient and dynamic friction coefficient between fibers and metals are $\mu_{s1}$ and $\mu_{d1}$, respectively.

(3) The bi-profiled polyester fibers are prepared from the spinning melt mentioned above through the steps of melt metering, extruding via the composite spinneret, cooling, oiling, drawing, heat setting and winding, and the spinning parameters in those technology steps are respectively set up as:

| | |
|---|---|
| Spinning temperature | T1, |
| Cooling temperature | T2, |
| Interlacing pressure | P1, |
| Speed of godet roller 1 | V1, |
| Temperature of godet roller1 | T1, |
| Speed of godet roller 2 | V2, |
| Temperature of godet roller 2 | T2, |
| Winding speed | V3, |
| Initial pressure of spinning pack | P0, |
| Pressure rising of spinning pack | ΔP'. |

Herein said composition spinneret is simultaneously provided with double-cross shaped orifices and circular orifices, and the length ratio of double-cross orifice to circular orifice is equal to the product of their equivalent diameter ratio and a coefficient K, here equivalent diameter is the ratio of orifice cross-section area to its circumference and K value is U. The length of double-cross spinneret orifices is W1, while the length and equivalent diameter of circular spinneret orifices are W2 and W3, respectively. All the spinneret orifices, specifically, all the center of circular orifices or all the circumferential center of double-cross orifices are arranged in regular intervals along the equally spaced concentric circles on the spinneret, and in the same ring both double-cross orifices and circular orifices are set up with a number ratio of X.

The final obtained fiber is a bi-profiled one composed of both double-cross monofilaments and circular monofilaments extruded from the same spinneret, and the double-cross monofilaments have a fineness of D1 and a flexural stiffness of Y1, whereas those of the circular monofilaments are D2 and Y2, respectively.

The bi-profiled fiber has a fineness of D3, a breaking strength of Z1, a breaking elongation of Z2, a breaking strength CV of Z3, a breaking elongation CV of Z4, a boiling water shrinkage of Z5 and a glossiness of Z6.

The synthesizing method of branched diol is demonstrated as follows. At first A1, A2 and triethylamine are reacted for 20 min under TO ° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol.

Example 1

Specifically, a method for preparing the bi-profiled fiber, comprising the steps:

(1) Preparation of spinning melt, wherein A' is 1:1.2:0.03, the catalyst is antimony trioxide, the extinction agent is titanium dioxide, the stabilizer is triphenyl phosphate, B' is atmospheric pressure, C is 250° C., D' is 90%, E is 0.01%, F is 0.20%, G is 0.05%, H is 30 min, I is 500 Pa, J is 260° C., k is 40 min, L' is 100 Pa, M is 275° C., N is 70 min, O is 0.6 wt %, P is 20000, Q is 2.0, R is 3%, S' is 1.0 wt %, T is 13 wt %, and the branched diol is 2-ethyl-2-methyl-1,3-propanediol with a formula of

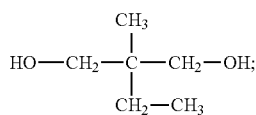

(2) Concoction of oiling agent, wherein the crown ether is 2-hydroxymethyl-12-crown ether-4, the potassium phosphate is potassium dodecyl phosphate, the sodium alkyl sulfonate is sodium dodecyl sulfonate, the grade of mineral oil is 9#, t1 is 40° C., t2 is 1 h, a1 is 2, a2 is 10, a3 is 90, a4 is 8, a5 is 3, b is 79.6 wt %, b2 is 14.5 wt %, b3 is 29.6 mm$^2$/s, b4 is 0.93 mm$^2$/s, c1 is 125N, c2 is 24.8 cN/cm, c3 is 1.3×10$^8$ Ω·cm, $\mu_s$ is 0.255, $\mu_d$ is 0.266, $\mu_{s1}$ is 0.203, $\mu_{d1}$ is 0.320, and d is 15 wt %;

(3) Manufacture of the bi-profiled fiber through the processes of melt metering, extruding via the composite spinneret, cooling, oiling, drawing, heat setting and winding, where Ti is 284° C., T2 is 22° C., P1 is 0.20 MPa, V1 is 2500 m/min, T2' is 75° C., V2 is 3600 m/min, T3 is 135° C., V3 is 3650 m/min, P0 is 120 bar, ΔP' is 0.5 bar/day, U is 0.97, W1 is 0.55 mm, W2 is 0.54 mm, W3 is 0.33 mm, and X is 1:10;

For the finally obtained bi-profiled fiber, D1 is 2.8 dtex, Y1 is 0.88×10$^5$ cN·cm$^2$, D2 is 0.30 dtex, Y2 is 0.0058×10$^{-5}$ cN·cm$^2$, D3 is 200 dtex, Z1 is 4.5 cN/dtex, Z2 is 40.0%, Z3 is 5.0%, Z4 is 9.0%, Z5 is 7.5%, and Z6 is 44% o Example 2

Specifically, a method for preparing the bi-profiled fiber, comprising the steps:

(1) Preparation of spinning melt, wherein A' is 1:1.3:0.04, the branched diol is 2,2-diethyl-1,3-propanediol, the catalyst is antimony glycolate, the extinction agent is titanium dioxide, the stabilizer is trimethyl phosphate, B' is atmospheric pressure, C is 260° C., D' is 91%, E is 0.02%, F is 0.21%, G is 0.03%, H is 35 min, I is 490 Pa, J is 261° C., k is 30 min, L' is 100 Pa, M is 277° C., N is 85 min, O is 0.6 wt %, P is 27000, Q is 1.8, R is 5%, S' is 1.2 wt %, T is 22 wt %, and the formula of 2,2-diethyl-1,3-propanediol is

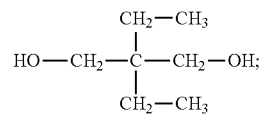

(2) Concoction of oiling agent, wherein the crown ether is 15-crown ether-5, the potassium phosphate is potassium iso-tridecanol polyoxyethylene ether phosphate, the sodium alkyl sulfonate is sodium pentadecyl sulfonate, the grade of mineral oil is 10#, t1 is 43° C., t2 is 1.5 h, a1 is 2, a2 is 15, a3 is 70, a4 is 10, a5 is 7, b is 67.3 wt %, b2 is 13 wt %, b3 is 28.1 mm$^2$/s, b4 is 0.93 mm$^2$/s, c1 is 123N, c2 is 25.1 cN/cm, c3 is 1.5×10$^8$ Ω·cm, $\mu_s$ is 0.257, $\mu_d$ is 0.265, $\mu_{s1}$ is 0.205, $\mu_{d1}$ is 0.323, and d is 14 wt %;

(3) Manufacture of the bi-profiled fiber through the processes of melt metering, extruding via the composite spinneret, cooling, oiling, drawing, heat setting and winding, where Ti is 280° C., T2 is 23° C., P1 is 0.25 MPa, V1 is 2500 m/min, T2' is 80° C., V2 is 3800 m/min, T3 is 140° C., V3 is 3780 m/min, P0 is 120 bar, ΔP' is 0.45 bar/day, U is 0.97, W1 is 1.25 mm, W2 is 1.24 mm, W3 is 0.48 mm, and X is 1:20;

For the finally obtained bi-profiled fiber, D1 is 3.2 dtex, Y1 is 0.95×10$^{-5}$ cN·cm$^2$, D2 is 0.25 dtex, Y2 is 0.0049×10$^{-5}$ cN·cm$^2$, D3 is 280 dtex, Z1 is 4.0 cN/dtex, Z2 is 43.0%, Z3 is 5.0%, Z4 is 9.2%, Z5 is 7.0%, and Z6 is 48% o Example 3

Specifically, a method for preparing the bi-profiled fiber, comprising the steps:

(1) Preparation of spinning melt, wherein A' is 1:1.4:0.05, the branched diol is 2-butyl-2-ethyl-1,3-propanediol, the catalyst is antimony acetate, the extinction agent is titanium dioxide, the stabilizer is trimethyl phosphite, B' is 0.1 MPa, C is 252° C., D' is 92%, E is 0.03%, F is 0.23%, G is 0.01%, H is 40 min, I is 495 Pa, J is 263° C., k is 45 min, L' is 95 Pa, M is 278° C., N is 60 min, O is 0.5 wt %, P is 21000, Q is 2.2, R is 4%, S' is 1.3 wt %, T is 34 wt %, and the formula of 2-butyl-2-ethyl-1,3-propanediol is

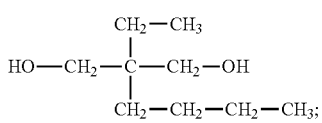

(2) Concoction of oiling agent, wherein the crown ether is 2-hydroxymethyl-15-crown ether-5, the potassium phosphate is potassium potassium dodeca-tetradecanol phosphate, the sodium alkyl sulfonate is sodium pentadecyl sulfonate, the grade of mineral oil is 11#, t1 is 48° C., t2 is 3 h, a1 is 8, a2 is 10, a3 is 85, a4 is 11, a5 is 5, b is 70.83 wt %, b2 is 11 wt %, b3 is 30.1 mm$^2$/s, b4 is 0.94 mm$^2$/s, c1 is 125N, c2 is 23.2 cN/cm, c3 is 1.8×10$^8$ Ω·cm, $\mu_s$ is 0.250, $\mu_d$ is 0.272, $\mu_{s1}$ is 0.209, $\mu_{d1}$ is 0.329, and d is 10 wt %;

(3) Manufacture of the bi-profiled fiber through the processes of melt metering, extruding via the composite spinneret, cooling, oiling, drawing, heat setting and winding, where Ti is 285° C., T2 is 20° C., P1 is 0.26 MPa, V1 is 2200 m/min, T2' is 75° C., V2 is 3700 m/min, T3 is 150° C., V3 is 3700 m/min, P0 is 120 bar, ΔP' is 0.56 bar/day, U is 0.97, W1 is 1.68 mm, W2 is 1.68 mm, W3 is 0.17 mm, and X is 1:15;

For the finally obtained bi-profiled fiber, D1 is 2.9 dtex, Y1 is 0.82×10$^5$ cN·cm$^2$, D2 is 0.24 dtex, Y2 is 0.0041×10$^{-5}$ cN·cm$^2$, D3 is 190 dtex, Z1 is 3.9 cN/dtex, Z2 is 43.0%, Z3 is 4.5%, Z4 is 9.5%, Z5 is 8.0%, and Z6 is 45%.

Example 4

Specifically, a method for preparing the bi-profiled fiber, comprising the steps:

(1) Preparation of spinning melt, wherein TO is 90° C., A1 is 3,3-diethyl-propionaldehyde, A2 is acetaldehyde, A' is 1:1.5:0.06, the branched diol is 3,3-diethyl-1,5-penpentadiol, the catalyst is antimony trioxide, the extinction agent is titanium dioxide, the stabilizer is triphenyl phosphate, B' is 0.3 MPa, C is 255° C., D' is 95%, E is 0.04%, F is 0.25%, G is 0.01%, H is 50 min, I is 400 Pa, J is 265° C., k is 33 min, L' is 90 Pa, M is 280° C., N is 50 min, O is 0.2 wt %, P is 23000, Q is 1.9, R is 3.5%, S' is 1.15 wt % o, T is 15 wt %, and the branched diol is 3,3-diethyl-1,5-penpentadiol with a formula of

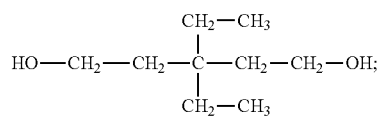

(2) Concoction of oiling agent, wherein the crown ether is 2-hydroxymethyl-12-crown ether-4, the potassium phosphate is potassium dodecyl phosphate, the sodium alkyl sulfonate is sodium hexadecyl sulfonate, the grade of mineral oil is 12#, t1 is 40° C., t2 is 2.5 h, a1 is 5, a3 is 95, a4 is 9, a5 is 2, b is 85.58 wt %, b2 is 9 wt %, b3 is 29.5 mm$^2$/s, b4 is 0.93 mm$^2$/s, c1 is 121N, c2 is 24.3 cN/cm, c3 is 1.0×10$^8$ Ω·cm, $\mu_s$ is 0.202, $\mu_d$ is 0.263, $\mu_{s1}$ is 0.202, $\mu_{d1}$ is 0.330, and d is 19 wt %;

(3) Manufacture of the bi-profiled fiber through the processes of melt metering, extruding via the composite spinneret, cooling, oiling, drawing, heat setting and winding, where Ti is 283° C., T2 is 20° C., P1 is 0.28 MPa, V1 is 2400 m/min, T2' is 78° C., V2 is 3600 m/min, T3 is 145° C., V3 is 3580 m/min, P0 is 120 bar, ΔP' is 0.6 bar/day, U is 0.97, W1 is 0.24 mm, W2 is 0.24 mm, W3 is 0.12 mm, and X is 1:15;

For the finally obtained bi-profiled fiber, D1 is 2.5 dtex, Y1 is 1.05×10$^5$ cN·cm$^2$, D2 is 0.20 dtex, Y2 is 0.027×10$^{-5}$ cN·cm$^2$, D3 is 150 dtex, Z1 is 3.6 cN/dtex, Z2 is 37.0%, Z3 is 4.0%, Z4 is 10.0%, Z5 is 8.0%, and Z6 is 43% o Example 5

Specifically, a method for preparing the bi-profiled fiber, comprising the steps:

(1) Preparation of spinning melt, wherein TO is 91° C., A1 is 4,4-diethyl-butyraldehyde, A2 is propanal, A' is 1:1.6:0.03, the catalyst is antimony glycolate, the extinction agent is titanium dioxide, the stabilizer is trimethyl phosphate, B' is atmospheric pressure, C is 257° C., D' is 92%, E is 0.05%, F is 0.20%, G is 0.04%, H is 33 min, I is 450 Pa, J is 270° C., k is 30 min, L' is 95 Pa, M is 275° C., N is 60 min, O is 0.5 wt %, P is 25000, Q is 2.1, R is 5%, S' is 1.2 wt %, T is 40 wt %, and the branched diol is 4,4-diethyl-1,7-heptanediol with a formula of

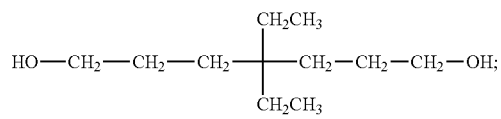

(2) Concoction of oiling agent, wherein the crown ether is 15-the crown ether-5, the potassium phosphate is potassium iso-tridecanol polyoxyethylene ether phosphate, the sodium alkyl sulfonate is sodium dodecyl sulfonate, the grade of mineral oil is 13#, t1 is 52° C., t2 is 2 h, a1 is 10, a2 is 5, a3 is 70, a4 is 8, a5 is 6, b is 70.70 wt %, b2 is 13.5 wt %, b3 is 28.6 mm$^2$/s, b4 is 0.95 mm$^2$/s, c1 is 126N, c2 is 24.9 cN/cm, c3 is 1.2×10$^8$ Ω·cm, $\mu_s$ is 0.251, $\mu_d$ is 0.262, $\mu_{s1}$ is 0.202, $\mu_{d1}$ is 0.332, and d is 11 wt %;

(3) Manufacture of the bi-profiled fiber through the processes of melt metering, extruding via the composite spinneret, cooling, oiling, drawing, heat setting and winding, wherein Ti is 287° C., T2 is 24° C., P1 is 0.30 MPa, V1 is 2200 m/min, T2' is 79° C., V2 is 3800 m/min, T3 is 155° C., V3 is 3660 m/min, P0 is 120 bar, ΔP' is 0.55 bar/day, U is 0.97, W1 is 0.38 mm, W2 is 0.38 mm, W3 is 0.45 mm, and X is 1:20.

For the finally obtained bi-profiled fiber, D1 is 3.3 dtex, Y1 is 1.22×10$^{-5}$ cN·cm$^2$, D2 is 0.30 dtex, Y2 is 0.0154×10$^5$ cN·cm$^2$. D3 is 150 dtex, Z1 is 4.8 cN/dtex, Z2 is 37.0%, Z3 is 4.8%, Z4 is 9.5%, Z5 is 7.5%, and Z6 is 46%.

Example 6

Specifically, a method for preparing the bi-profiled fiber, comprising the steps:

(1) Preparation of spinning melt, wherein TO is 92° C., A1 is 4,4-bis(1-methy ethyl)-butyraldehyde, A2 is propanal, A' is 1:1.7:0.05, the catalyst is antimony acetate, the extinction agent is titanium dioxide, the stabilizer is trimethyl phosphite, B' is 0.2 MPa, C is 253° C., D' is 96%, E is 0.01%, F is 0.20%, G is 0.05%, H is 38 min, I is 480 Pa, J is 262° C., k is 38 min, L' is 98 Pa, M is 279° C., N is 80 min, O is 0.55 wt %, P is 27000, Q is 2.2, R is 4%, S' is 1.5 wt %, T is 38 wt %, and the branched diol is 4,4-bis(1-methyl ethyl)-1,7-heptanediol with a formula of

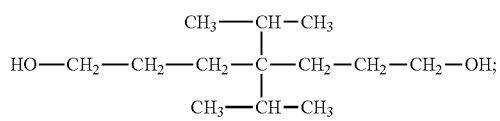

(2) Concoction of oiling agent, wherein the crown ether is 2-hydroxymethyl-15-crown ether-5, the potassium phosphate is potassium dodeca-tetradecanol phosphate, the sodium alkyl sulfonate is sodium pentadecyl sulfonate, the grade of mineral oil is 14#, t1 is 55° C., t2 is 1 h, a1 is 3, a2 is 5, a3 is 75, a4 is 14, a5 is 7, b is 68.8 wt %, b2 is 12 wt %, b3 is 27.5 mm$^2$/s, b4 is 0.95 mm$^2$/s, c1 is 126N, c2 is 25.4 cN/cm, c3 is 1.6×10$^8$ Ω·cm, $\mu_s$ is 0.255, $\mu_d$ is 0.267, $\mu_{s1}$ is 0.203, $\mu_{d1}$ is 0.330, and d is 20 wt %;

(3) Manufacture of the bi-profiled fiber through the processes of melt metering, extruding via the composite spinneret, cooling, oiling, drawing, heat setting and winding, wherein Ti is 290° C., T2 is 25° C., P1 is 0.27 MPa, V1 is 2500 m/min, T2' is 80° C., V2 is 3900 m/min, T3 is 150° C., V3 is 3790 m/min, P0 is 120 bar, ΔP' is 0.42 bar/day, U is 0.97, W1 is 0.95 mm, W2 is 0.95 mm, W3 is 0.52 mm, and X is 1:25.

For the finally obtained bi-profiled fiber, D1 is 2.5 dtex, Y1 is 0.97×10$^5$ cN·cm$^2$, D2 is 0.25 dtex, Y2 is 0.0021×10$^5$ cN·cm$^2$. D3 is 300 dtex, Z1 is 3.7 cN/dtex, Z2 is 40.0%, Z3 is 4.6%, Z4 is 9.9%, Z5 is 7.5%, and Z6 is 41%.

Example 7

Specifically, a method for preparing the bi-profiled fiber, comprising the steps:

(1) Preparation of spinning melt, wherein TO is 93° C., A1 is 3,3-dipropyl-propionaldehyde, A2 is acetaldehyde, A' is 1:1.8:0.03, the catalyst is antimony trioxide, the extinction agent is titanium dioxide, the stabilizer is triphenyl phosphate, B' is 0.3 MPa, C is 250° C., D' is 90%, E is 0.03%, F is 0.24%, G is 0.02%, H is 42 min, I is 455 Pa, J is 264° C., k is 45 min, L' is 85 Pa, M is 285° C., N is 75 min, O is 0.45 wt %, P is 26500, Q is 2.2, R is 4.5%, S' is 1.25 wt %, T is 27 wt %, and the branched diol is 3,3-dipropyl-1,5-pentanediol with a formula of

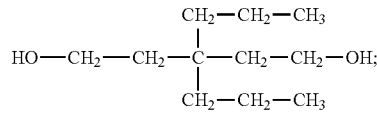

(2) Concoction of oiling agent, wherein the crown ether is 15-crown ether-5, the potassium phosphate is potassium dodecyl phosphate, the sodium alkyl sulfonate is sodium hexadecyl sulfonate, the grade of mineral oil is 15#, t1 is 41° C., t2 is 2 h, a1 is 8, a2 is 20, a3 is 100, a4 is 15, a5 is 2, b is 68.97 wt %, b2 is 8.5 wt %, b3 is 28.4 mm$^2$/s, b4 is 0.94 mm$^2$/s, c1 is 122N, c2 is 26.8 cN/cm, c3 is 1.8×10$^8$ Ω·cm, $\mu_s$ is 0.263, $\mu_d$ is 0.268, $\mu_{s1}$ is 0.210, $\mu_{d1}$ is 0.320, and d is 13 wt %;

(3) Manufacture of the bi-profiled fiber through the processes of melt metering, extruding via the composite spinneret, cooling, oiling, drawing, heat setting and winding, wherein Ti is 280° C., T2 is 25° C., P1 is 0.29 MPa, V1 is 2600 m/min, T2' is 82° C., V2 is 3900 m/min, T3 is 135° C., V3 is 3840 m/min, P0 is 120 bar, ΔP' is 0.58 bar/day, U is 0.97, W1 is 2.08 mm, W2 is 2.08 mm, W3 is 0.48 mm, and X is 1:10.

For the finally obtained bi-profiled fiber, D1 is 3.4 dtex, Y1 is 0.82×10$^{-5}$ cN·cm$^2$, D2 is 0.22 dtex, Y2 is 0.0085×10$^5$ cN cm$^2$. D3 is 200 dtex, Z1 is 3.9 cN/dtex, Z2 is 40.0%, Z3 is 5.0%, Z4 is 10.0%, Z5 is 7.5%, and Z6 is 43%.

Example 8

Specifically, a method for preparing the bi-profiled fiber, comprising the steps:

(1) Preparation of spinning melt, wherein TO is 94° C., A1 is 4,4-dipropyl-butyraldehyde, A2 is acetaldehyde, A' is 1:1.9:0.04, the catalyst is antimony glycolate, the extinction agent is titanium dioxide, the stabilizer is trimethyl phosphate, B' is 0.3 MPa, C is 260° C., D' is 93%, E is 0.04%, F is 0.21%, G is 0.03%, H is 45 min, I is 475 Pa, J is 265° C., k is 48 min, L' is 88 Pa, M is 283° C., N is 80 min, O is 0.6 wt %, P is 23000, Q is 2.0, R is 3%, S' is 1.4 wt %, T is 50 wt %, and the branched diol is 4,4-dipropyl-1,7-heptanediol with a formula of

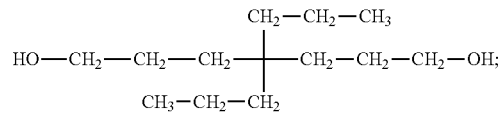

(2) Concoction of oiling agent, wherein the crown ether is 2-hydroxymethyl-12-crown ether-4, the potassium phosphate is potassium dodeca-tetradecanol phosphate, the sodium alkyl sulfonate is sodium pentadecyl sulfonate, the grade of mineral oil is 16#, t1 is 45° C., t2 is 3 h, a1 is 9, a3 is 80, a4 is 12, a5 is 5, b is 83.33 wt %, b2 is 14 wt %, b3 is 30.0 mm$^2$/s, b4 is 0.93 mm$^2$/s, c1 is 127N, c2 is 23.5 cN/cm, c3 is 1.5×10$^8$ Ω·cm, $\mu_s$ is 0.262, $\mu_d$ is 0.273, $\mu_{s1}$ is 0.2038, $\mu_{d1}$ is 0.328, and d is 18 wt %;

(3) Manufacture of the bi-profiled fiber through the processes of melt metering, extruding via the composite spinneret, cooling, oiling, drawing, heat setting and winding, wherein Ti is 284° C., T2 is 20° C., P1 is 0.30 MPa, V1 is 2600 m/min, T2' is 85° C., V2 is 3700 m/min, T3 is 160° C., V3 is 3840 m/min, P0 is 120 bar, ΔP' is 0.33 bar/day, U is 0.97, W1 is 2.00 mm, W2 is 2.00 mm, W3 is 0.34 mm, and X is 1:20.

For the finally obtained bi-profiled fiber, D1 is 3.5 dtex, Y1 is 1.38×10$^{-5}$ cN·cm$^2$, D2 is 0.24 dtex, Y2 is 0.0027×10$^{-5}$ cN cm$^2$. D3 is 250 dtex, Z1 is 3.6 cN/dtex, Z2 is 37.0%, Z3 is 4.0%, Z4 is 9.6%, Z5 is 8.0%, and Z6 is 47%.

Example 9

Specifically, a method for preparing the bi-profiled fiber, comprising the steps:

(1) Preparation of spinning melt, wherein TO is 95° C., A1 is 4-methyl-4-(1,1-dimethyl ethyl)-butyraldehyde, A2 is propanal, A' is 1:2.5:0.05, the catalyst is antimony acetate, the extinction agent is titanium dioxide, the stabilizer is trimethyl phosphate, B' is atmospheric pressure, C is 251° C., D' is 96%, E is 0.05%, F is 0.22%, G is 0.04%, H is 30 min, I is 420 Pa, J is 267° C., k is 50 min, L' is 80 Pa, M is 280° C., N is 90 min, O is 0.25 wt %, P is 24000, Q is 2.2, R is 4%, S' is 1.0 wt %, T is 23 wt %, and the branched diol is 4-methyl-4-(1,1-dimethyl ethyl)-1,7-heptanediol with a formula of

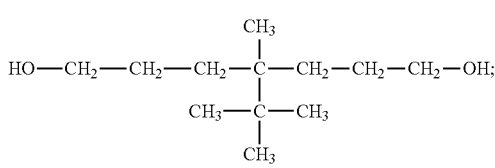

(2) Concoction of oiling agent, wherein the crown ether is 2-hydroxymethyl-15-crown ether-5, the potassium phosphate is potassium dodecyl phosphate, the sodium alkyl sulfonate is sodium dodecyl sulfonate, t1 is 55° C., t2 is 1 h, a2 is 15, a3 is 90, a4 is 8, a5 is 7, b is 81.81 wt %, b2 is 10 wt %, b3 is 29.7 mm$^2$/s, b4 is 0.94 mm$^2$/s, c1 is 126N, c2 is 24.8 cN/cm, c3 is 1.8×10$^8$ Ω·cm, $\mu_s$ is 0.250, $\mu_d$ is 0.264, $\mu_{s1}$ is 0.210, $\mu_{d1}$ is 0.321, and d is 10 wt %;

(3) Manufacture of the bi-profiled fiber through the processes of melt metering, extruding via the composite spinneret, cooling, oiling, drawing, heat setting and winding, wherein Ti is 286° C., T2 is 21° C., P1 is 0.20 MPa, V1 is 2200 m/min, T2' is 75° C., V2 is 3700 m/min, T3 is 165° C., V3 is 3585 m/min, P0 is 20 bar, ΔP' is 0.6 bar/day, U is 0.97, W1 is 2.03 mm, W2 is 2.05 mm, W3 is 0.31 mm, and X is 1:30.

For the finally obtained bi-profiled fiber, D1 is 3.5 dtex, Y1 is 1.34×10$^{-5}$ cN·cm$^2$, D2 is 0.30 dtex, Y2 is 0.005×10$^5$ cN·cm$^2$. D3 is 280 dtex, Z1 is 4.0 cN/dtex, Z2 is 43.0%, Z3 is 4.7%, Z4 is 9.1%, Z5 is 7.0%, and Z6 is 46%.

Example 10

Specifically, a method for preparing the bi-profiled fiber, comprising the steps:

(1) Preparation of spinning melt, wherein TO is 90° C., A1 is 3-methyl-3-amyl-propionaldehyde, A2 is propanal, A' is 1:1.2:0.06, the catalyst is antimony glycolate, the extinction agent is titanium dioxide, the stabilizer is trimethyl phosphite, B' is 0.1 MPa, C is 255° C., D' is 92%, E is 0.01%, F is 0.20%, G is 0.01%, H is 50 min, I is 490 Pa, J is 269° C., k is 30 min, L' is 100 Pa, M is 281° C., N is 55 min, O is 0.1 wt %, P is 20000, Q is 1.9, R is 3.5%, S' is 1.3 wt %, T is 44 wt %, and the branched diol is 3-methyl-3-amyl-1,6-hexanediol with a formula of

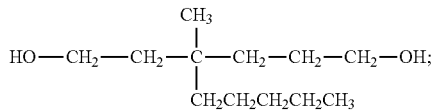

(2) Concoction of oiling agent, wherein the crown ether is 2-hydroxymethyl-15-crown ether-5, the potassium phosphate is potassium dodecyl phosphate, the sodium alkyl sulfonate is sodium dodecyl sulfonate, t1 is 55° C., t2 is 3 h, a2 is 15, a3 is 90, a4 is 8, a5 is 7, b is 81.81 wt %, b2 is 10 wt %, b3 is 29.7 mm$^2$/s, b4 is 0.94 mm$^2$/s, c1 is 126N, c2 is 24.8 cN/cm, c3 is 1.8×10$^8$ gΩ·cm, $\mu_s$ is 0.250, $\mu_d$ is 0.264, $\mu_{s1}$ is 0.210, $\mu_{d1}$ is 0.321, and d is 10 wt %;

(3) Manufacture of the bi-profiled fiber through the processes of melt metering, extruding via the composite spinneret, cooling, oiling, drawing, heat setting and winding, wherein Ti is 290° C., T2 is 22° C., P1 is 0.22 MPa, V1 is 2400 m/min, T2' is 77° C., V2 is 3600 m/min, T3 is 135° C., V3 is 3600 m/min, P0 is 120 bar, ΔP' is 0.3 bar/day, U is 0.97, W1 is 1.66 mm, W2 is 1.66 mm, W3 is 0.17 mm, and X is 1:30.

For the finally obtained bi-profiled fiber, D1 is 2.6 dtex, Y1 is 0.84×10$^{-5}$ cN·cm$^2$, D2 is 0.21 dtex, Y2 is 0.0068×10$^{-5}$ cN·cm$^2$. D3 is 170 dtex, Z1 is 4.4 cN/dtex, Z2 is 40.0%, Z3 is 4.6%, Z4 is 9.5%, Z5 is 7.0%, and Z6 is 44%.

Example 11

Specifically, a method for preparing the bi-profiled fiber, comprising the steps:

(1) Preparation of spinning melt, wherein TO is 95° C., A1 is 3,3-dipentyl-propionaldehyde, A2 is acetaldehyde, A' is 1:2.0:0.03, the catalyst is antimony acetate, the extinction agent is titanium dioxide, the stabilizer is trimethyl phosphite, B' is 0.2 MPa, C is 250° C., D' is 97%, E is 0.01%, F is 0.23%, G is 0.05%, H is 45 min, I is 500 Pa, J is 260° C., k is 40 min, L' is 92 Pa, M is 277° C., N is 80 min, O is 0.35 wt %, P is 25500, Q is 1.8, R is 5%, S' is 1.45 wt %, T is 41 wt %, and the branched diol is 3,3-dipropyl-1,5-pentanediol with a formula of

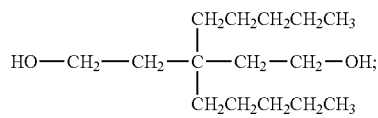

(2) Concoction of oiling agent, wherein the crown ether is 2-hydroxymethyl-12-crown ether-4, the potassium phosphate is potassium dodecyl phosphate, the sodium alkyl sulfonate is sodium dodecyl sulfonate, the grade of mineral oil is 9#, t1 is 40° C., t2 is 1 h, a1 is 2, a2 is 10, a3 is 90, a4 is 8, a5 is 3, b is 79.6 wt %, b2 is 14.5 wt %, b3 is 29.6 mm$^2$/s, b4 is 0.93 mm$^2$/s, c1 is 125N, c2 is 24.8 cN/cm, c3 is 1.3×10$^8$ Ω·cm, $\mu_s$ is 0.255, $\mu_d$ is 0.266, $\mu_{s1}$ is 0.203, $\mu_{d1}$ is 0.320, and d is 20 wt %;

(3) Manufacture of the bi-profiled fiber through the processes of melt metering, extruding via the composite spinneret, cooling, oiling, drawing, heat setting and winding, wherein Ti is 290° C., T2 is 25° C., P1 is 0.25 MPa, V1 is 2200 m/min, T2' is 80° C., V2 is 3800 m/min, T3 is 165° C., V3 is 3680 m/min, P0 is 120 bar, ΔP' is 0.52 bar/day, U is 0.97, W1 is 1.05 mm, W2 is 1.06 mm, W3 is 0.52 mm, and X is 1:10.

For the finally obtained bi-profiled fiber, D1 is 2.5 dtex, Y1 is 0.90×10$^5$ cN·cm$^2$, D2 is 0.20 dtex, Y2 is 0.0027×10$^5$ cN·cm$^2$. D3 is 190 dtex, Z1 is 4.5 cN/dtex, Z2 is 43.0%, Z3 is 5.0%, Z4 is 9.5%, Z5 is 8.0%, and Z6 is 48%.

What is claimed is:

1. A bi-profiled fiber, comprising a cross monofilament and a circular monofilament, wherein the double-cross monofilament and the circular monofilament are simultaneously extruded from a spinneret, the bi-profiled fiber is made of a modified polyester, and a matte agent is dispersed in the modified polyester;

wherein the modified polyester comprises a terephthalic acid segment, an ethylene glycol segment and a branched diol segment, and the branched diol segment has a structural formula of

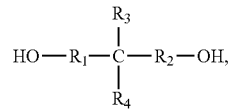

wherein, each of $R_1$ and $R_2$ is selected from a linear alkylene with 1-3 carbon atoms, $R_3$ is selected from an alkyl with 1-5 carbon atoms, and $R_4$ is selected from an alkyl with 2-5 carbon atoms;

wherein the matte agent is a mixture of amorphous titanium dioxide and amorphous silicon dioxide, or a mixture of calcium carbonate and amorphous silicon dioxide.

2. The bi-profiled fiber of claim 1, wherein the double-cross monofilament has a fineness of 2.5-3.5dtex and the circular monofilament has a fineness of 0.20-0.30 dtex;

wherein the double-cross monofilament has a flexural stiffness of $0.82 \times 10^{-5}$-$1.38 \times 10^{-5}$cN·cm$^2$ and the circular monofilament has a flexural stiffness of $0.0041 \times 10^{-5}$-$0.027 \times 10^{-5}$cN·cm$^2$;

wherein the bi-profiled fiber has a fineness of 150-300 dtex, a breaking strength of greater than or equal to 3.6cn/dtex, a breaking elongation of 40.0±3.0%, a breaking strength CV of less than or equal to 5.0%, a breaking elongation CV of less than or equal to 10.0%, a boiling water shrinkage of 7.5±0.5%, and a glossiness of less than 50%.

3. The bi-profiled fiber of claim 2, wherein a content of a cyclic oligomer in the modified polyester is less than or equal to 0.6 wt %;

the modified polyester has a number average molecular weight of 20000-27000 and a molecular weight distribution index of 1.8-2.2;

a molar content of the branched diol segment in the the modified polyester is 3-5% of a molar content of the terephthalic acid segment;

the branched diol segment is 2-ethyl-2-methyl-1,3-propanediol, 2,2-diethyl-1,3-propanediol, 2-butyl-2-ethyl-1,3-propanediol, 3,3 -diethyl-1,5 -penpentadiol, 4,4-diethyl-1,7-heptanediol, 4,4-bis(1-methyl ethyl)-1,7-heptanediol, 3,3 -dipropyl-1,5-pentanediol, 4,4-dipropyl-1,7-heptanediol, 4-methyl-4-(1,1-dimethyl ethyl)-1,7-heptanediol, 3 -methyl-3 -amyl-1, 6-hexanediol or 3,3 -dipropyl-1,5 -pentanediol.

4. The bi-profiled fiber of claim 2, wherein an amount of the matte agent is 1.0-1.5 wt % of the modified polyester, and a content of the amorphous silicon dioxide in the matte agent is 13-50 wt %.

5. The bi-profiled fiber of claim 1, wherein a content of a cyclic oligomer in the modified polyester is less than or equal to 0.6wt %;

the modified polyester has a number average molecular weight of 20000-27000 and a molecular weight distribution index of 1.8-2.2;

a molar content of the branched diol segment in the the modified polyester is 3-5 % of a molar content of the terephthalic acid segment;

the branched diol segment is 2-ethyl-2-methyl-1,3-propanediol, 2,2-diethyl-1,3 -propanediol, 2-butyl-2-ethyl-1,3-propanediol, 3,3 -diethyl-1,5-penpentadiol, 4,4-diethyl-1,7-heptanediol, 4,4-bis(1-methyl ethyl)-1,7-heptanediol, 3,3-dipropyl-1,5-pentanediol, 4,4-dipropyl-1,7- heptanediol, 4-methyl-4-(1,1-dimethyl ethyl)-1,7-heptanediol, 3 -methyl-3 -amyl-1,6-hexanediol or 3,3 -dipropyl-1,5-pentanediol.

6. The bi-profiled fiber of claim 5, wherein the modified polyester is prepared by: uniformly mixing a terephthalic acid, an ethylene glycol and a branched diol to obtain a slurry;

then performing an esterification reaction and a polycondensation reaction on the slurry to obtain the modified polyester;

the esterification reaction comprises:

mixing the terephthalic acid, the ethylene glycol and the branched diol to obtain the slurry;

adding a catalyst, an extinction agent and a stabilizer into the slurry to obtain a first mixture;

carrying out the esterification reaction on the first mixture under a pressure of nitrogen atmosphere to obtain a second mixture, wherein during the esterification reaction, the pressure ranges from an atmospheric pressure to 0.3 MPa, a reaction temperature is 250-260° C., the esterification reaction ends when a water elimination amount in the esterification reaction reaches 90% of a theoretical value;

(2) the polycondensation reaction comprises:

after the esterification reaction ends, performing the polycondensation reaction on the second mixture at a negative pressure to obtain the modified polyester, wherein the polycondensation reaction comprises a coarse vacuum stage and a fine vacuum stage, wherein during the coarse vacuum stage, a first pressure is smoothly reduced from a normal value to less than 500 Pa within 30-50 min, a first reaction temperature is 275-285° C., while and a first reaction time is 30-50 min, during the fine vacuum stage, a second pressure is furtherly reduced to less than 100 Pa, a second reaction temperature is 260-270° C., while and a second reaction time is 50-90 min.

7. The bi-profiled fiber of claim 6, wherein a molar ration of the terephthalic acid, the ethylene glycol to the branched diol is 1(1.2-2.0)(0.03-0.06), an amount of the catalyst is 0.01-0.05% by weight of the terephthalic acid, an amount of the extinction agent is 0.20-0.25% by weight of the terephthalic acid and an amount of the stabilizer is 0.01-0.05% by weight of the terephthalic acid;

the catalyst is of antimony trioxide, antimony glycol or antimony acetate, the extinction agent is titanium dioxide, and the stabilizer is of triphenyl phosphate, trimethyl phosphate or trimethyl phosphite.

8. The bi-profiled fiber of claim 1, wherein an amount of the matte agent is 1.0-1.5 wt % of the modified polyester, and a content of the amorphous silicon dioxide in the matte agent is 13-5 wt %.

9. A method for preparing the bi-profiled fiber of claim 1, comprising performing metering, extruding via the spinneret, cooling, oiling, drawing, heat setting and winding on a spinning melt to obtain the bi-profiled fiber;

wherein the spinning melt comprises the modified polyester and the matte agent;

the spinneret is simultaneously provided with a plurality of double-cross shaped orifices and a plurality of circular orifices;

a ratio of a length of each double-cross orifice of the plurality of double-cross orifices to a length of each circular orifice of the plurality of circular orifices is equal to a product of a ratio of an equivalent diameter of the each double-cross orifice to an equivalent diameter of the each circular orifice and a coefficient K, the equivalent diameter of the each double- cross orifice is a ratio of a cross-sectional area to a cross-sectional circumference of the each double-cross orifice, the equivalent diameter of the each circular orifice is a ratio of a cross-sectional area to a cross-sectional circumference of the each circular orifice, and the coefficient K ranges from 0.97 to 1.03;

an oiling agent in the oiling contains 67.30-85.58 wt % of crown ether.

10. The method for preparing the bi-profiled fiber of claim 9, wherein the length of the each double-cross orifice or the length of the each circular orifice is 0.24-2.08 mm, the equivalent diameter of the each double-cross orifice or the equivalent diameter of the each circular orifice is 0.12-0.52 mm;

the plurality of circular orifices and the plurality of double-cross orifices are arranged on the spinneret; centers of the plurality of circular orifices or circumferential centers of the plurality of double-cross orifices are arranged in regular intervals on a plurality of equally spaced concentric circles; a plurality of orifices of the plurality of double- cross orifices and the plurality of circular orifices are arranged on a same circle; the plurality of orifices on the same circle comprises double-cross orifices and circular orifices, and a quantity ratio of the double-cross orifices to the circular orifices is 1:10-30.

11. The method for preparing the bi-profiled fiber of claim 10, a plurality of spinning process parameters of the bi-profiled fiber are as follows:

spinning temperature 280-290° C.;
cooling temperature 20-25° C.;
interlacing pressure 0.20-0.30 MPa;
speed of a first godet roller 2200-2600 m/min;
temperature of the first godet roller 75-85° C.;
speed of a second godet roller 3600-3900 m/min;
temperature of the second godet roller 135-165° C.;
winding speed 3580-3840 m/min; and
an initial pressure of a spinning pack is 120 bar and a pressure rising AP is equal to or less than 0.6 bar/day.

12. The method for preparing the bi-profiled fiber of claim 9, wherein a weight loss of the oiling agent is less than 15% after a heat treatment at 200° C. for 2 hours;

wherein the oiling agent has a kinetic viscosity of 27.5-30.1 mm$^2$/s at 50±0.01° C., and the kinetic viscosity becomes 0.93-0.95 mm$^2$/s when the oiling agent is dispersed with a content of 10 wt % in water to form an emulsion;

wherein the oiling agent has an oil film strength of 121-127 N;

wherein the oiling agent has a surface tension of 23.2-26.8 cN/cm and a specific resistance of $1.0 \times 10^8$-$1.8 \times 10^8 \Omega \cdot cm$;

after the oiling, a static friction coefficient between the bi-profiled fibers is 0.250-0.263, and a dynamic friction coefficient between the bi-profiled fibers is 0.262-0.273;

after the oiling, a static friction coefficient between the bi-profiled fiber and a metal is 0.202-0.210, and a dynamic friction coefficient between the bi-profiled fiber and the metal is 0.320-0.332;

the crown ether is 2 hydroxymethyl-12-crown ether-4, 15-crown ether-5 or 2-hydroxymethyl-15-crown ether-5;

the oiling agent further contains a mineral oil, a potassium phosphate, trimethylolpropane laurate and sodium alkyl sulfonate;

the mineral oil is one selected from the group consisting of 9 #-17 # mineral oil;

the potassium phosphate is a potassium salt of dodecyl phosphate, iso-tridecanol polyoxyethylene ether phosphate or dodeca-tetradecanol phosphate;

the sodium alkyl sulfonate is a sodium salt of dodecyl sulfonate, pentadecyl sulfonate or hexadecyl sulfonate;

the oiling agent before used is dispersed with a content of 10-20 wt % in water to form the emulsion; and a method for preparing the oiling agent comprises: mixing the crown ether, the potassium phosphate, the trimethylolpropane laurate and the sodium alkyl sulfonate to obtain a mixture, and then adding the mixture into the mineral oil to obtain the oiling agent;

an amount of each of the mineral oil, the potassium phosphate, the trimethylolpropane laurate, the crown ether, and the sodium alkyl sulfonate by weight is as follows:

| mineral oil | 0-10 phr, |
| trimethylolpropane laurate | 0-20 phr, |
| crown ether | 70-100 phr, |
| potassium phosphate | 8-15 phr, |
| sodium alkyl sulfonate | 2-7 phr, | the mixing is carried out by performing a stirring at 40-55° C. for 1-3 hours.

13. The method for preparing the bi-profiled fiber of claim 12, a plurality of spinning process parameters of the bi-profiled fiber are as follows:

spinning temperature 280-290° C.;
cooling temperature 20-25° C.;
interlacing pressure 0.20-0.30 MPa;
speed of a first godet roller 2200-2600 m/min;
temperature of the first godet roller 75-85° C.;
speed of a second godet roller 3600-3900 m/min;
temperature of the second godet roller 135-165° C.;
winding speed 3580-3840 m/min; and
an initial pressure of a spinning pack is 120 bar and a pressure rising AP is equal to or less than 0.6 bar/day.

14. The method for preparing the bi-profiled fiber of claim 9, a plurality of spinning process parameters of the bi-profiled fiber are as follows:

spinning temperature 280-290° C.;
cooling temperature 20-25° C.;
interlacing pressure 0.20-0.30 MPa;
speed of a first godet roller 2200-2600 m/min;
temperature of the first godet roller 75-85° C.;
speed of a second godet roller 3600-3900 m/min;
temperature of the second godet roller135-165° C.;
winding speed 3580-3840 m/min; and
an initial pressure of a spinning pack is 120 bar and a pressure rising AP is equal to or less than 0.6 bar/day.

15. The method for preparing the bi-profiled fiber of claim 9, wherein the double-cross monofilament has a fineness of 2.5-3.5 dtex and the circular monofilament has a fineness of 0.20-0.30 dtex;

wherein the double-cross monofilament has a flexural stiffness of $0.82 \times 10^{-5}$-$1.38 \times 10^{-5} cN \cdot cm^2$ and the circular monofilament has a flexural stiffness of $0.0041 \times 10^{-5}$-$0.027 \times 10^{-5} cN \cdot cm^2$;

wherein the bi-profiled fiber has a fineness of 150-300dtex, a breaking strength of greater than or equal to 3.6 cn/dtex, a breaking elongation of 40.0±3.0%, a breaking strength CV of less than or equal to 5.0%, a breaking elongation CV of less than or equal to 10.0%, a boiling water shrinkage of 7.5±0.5%, and a glossiness of less than 50%.

16. The method for preparing the bi-profiled fiber of claim 9, wherein a content of a cyclic oligomer in the modified polyester is less than or equal to 0.6 wt %;

the modified polyester has a number average molecular weight of 20000-27000 and a molecular weight distribution index of 1.8-2.2;

a molar content of the branched diol segment in the the modified polyester is 3-5% of a molar content of the terephthalic acid segment;

the branched diol segment is 2-ethyl-2-methyl-1,3-propanediol, 2,2-diethyl-1,3-propanediol, 2-butyl-2-ethyl-1,3-propanediol, 3,3 -diethyl-1,5-penpentadiol, 4,4-diethyl-1,7-heptanediol, 4,4-bis(1-methyl ethyl)-1,7-heptanediol, 3,3 -dipropyl-1,5-pentanediol, 4,4-dipropyl-1,7-heptanediol, 4-methyl-4-(1,1-dimethyl ethyl)-1,7-heptanediol, 3 -methyl-3 -amyl-1, 6-hexanediol or 3,3 -dipropyl-1,5-pentanediol.

17. The method for preparing the bi-profiled fiber of claim 16, wherein the modified polyester is prepared by: uniformly mixing a terephthalic acid, an ethylene glycol and a branched diol to obtain a slurry;

then performing an esterification reaction and a polycondensation reaction on the slurry to obtain the modified polyester;

(1) the esterification reaction comprises:

mixing the terephthalic acid, the ethylene glycol and the branched diol to obtain the slurry;

adding a catalyst, an extinction agent and a stabilizer into the slurry to obtain a first mixture;

carrying out the esterification reaction on the first mixture under a pressure of nitrogen atmosphere to obtain a second mixture, wherein during the esterification reaction, the pressure ranges from an atmospheric pressure to 0.3 MPa, a reaction temperature is 250-260° C., and the esterification reaction ends when a water elimination amount in the esterification reaction reaches 90% of a theoretical value;

(2) the polycondensation reaction comprises:

after the esterification reaction ends, performing the polycondensation reaction on the second mixture at a negative pressure to obtain the modified polyester, wherein the polycondensation reaction comprises a coarse vacuum stage and a fine vacuum stage, wherein during the coarse vacuum stage, a first pressure is smoothly reduced from a normal value to less than 500Pa within 30-50 min, a first reaction temperature is 275-285° C., and a first reaction time is 30-50min, during the fine vacuum stage, a second pressure is furthered reduced to less than 100Pa, a second reaction temperature is 260-270° C., and a second reaction time is 50-90 min.

18. The method for preparing the bi-profiled fiber of claim 17, wherein a molar ration of the terephthalic acid, the ethylene glycol to the branched diol is 1:(1.2-2.0): (0.03-0.06), an amount of the catalyst is 0.01-0.05% by weight of the terephthalic acid, an amount of the extinction agent is 0.20-0.25% by weight of the terephthalic acid and an amount of the stabilizer s 0.01-0.05% by weight of the terephthalic acid;

the catalyst is antimony trioxide, antimony glycol or antimony acetate, the extinction agent is titanium dioxide, and the stabilizer is triphenyl phosphate, trimethyl phosphate or trimethyl phosphite.

19. The method for preparing the bi-profiled fiber of claim 9, wherein an amount of the matte agent is 1.0-1.5 wt % of the modified polyester, and a content of the amorphous silicon dioxide in the matte agent is 13-50 wt %.

* * * * *